United States Patent
Sherman et al.

(10) Patent No.: US 9,404,772 B2
(45) Date of Patent: Aug. 2, 2016

(54) ILLUMINATION RING IN POINTER HUB

(71) Applicant: Continental Automotive Systems, Inc., Auburn Hills, MI (US)

(72) Inventors: Matthew Scott Sherman, New Hudson, MI (US); Michael E. Carrel, Northville, MI (US); Vyacheslav Birman, Auburn Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 191 days.

(21) Appl. No.: 14/086,196

(22) Filed: Nov. 21, 2013

(65) Prior Publication Data

US 2015/0138751 A1    May 21, 2015

(51) Int. Cl.
*G01D 11/28* (2006.01)
*G01D 13/26* (2006.01)

(52) U.S. Cl.
CPC .............. *G01D 11/28* (2013.01); *G01D 13/265* (2013.01)

(58) Field of Classification Search
CPC ............................. G01D 13/265; G01D 11/28
See application file for complete search history.

(56) References Cited

U.S. PATENT DOCUMENTS

| | | | |
|---|---|---|---|
| 7,549,390 B2 | 6/2009 | Verdouw | |
| 7,637,623 B2 | 12/2009 | Wang et al. | |
| 7,798,026 B2 | 9/2010 | Takato et al. | |
| 2005/0083187 A1 | 4/2005 | Birman et al. | |
| 2005/0162843 A1* | 7/2005 | Lee | G01D 13/265 362/23.2 |
| 2008/0000410 A1* | 1/2008 | Mori | B60K 37/02 116/62.4 |
| 2008/0089051 A1* | 4/2008 | Wang | G06Q 3/044 362/23.12 |
| 2008/0264328 A1 | 10/2008 | Birman et al. | |
| 2009/0266292 A1 | 10/2009 | Fournier | |
| 2010/0064962 A1* | 3/2010 | Birman | G01D 11/28 116/288 |
| 2011/0107575 A1* | 5/2011 | Aono | B60K 35/00 29/283.5 |
| 2012/0247385 A1 | 10/2012 | Cook | |

FOREIGN PATENT DOCUMENTS

| | | |
|---|---|---|
| DE | 102010055076 A1 | 12/2012 |
| JP | 579434 | 1/1982 |
| JP | 2008512651 A | 4/2008 |
| JP | 2012189501 | 10/2012 |

OTHER PUBLICATIONS

European Patent Office Search Report dated Mar. 31, 2015.
English Translation of JP Office Action dated Oct. 13, 2015.

* cited by examiner

*Primary Examiner* — Mary Ellen Bowman

(57) ABSTRACT

A pointer assembly for a gauge is disclosed and includes a pointer including a pointer arm extending from a pointer base and a crown attached to the pointer body including an illuminatable ring. A cap is mounted over the pointer and the crown and includes a first slot revealing the illuminatable ring and a second slot revealing a portion of the pointer arm.

24 Claims, 6 Drawing Sheets

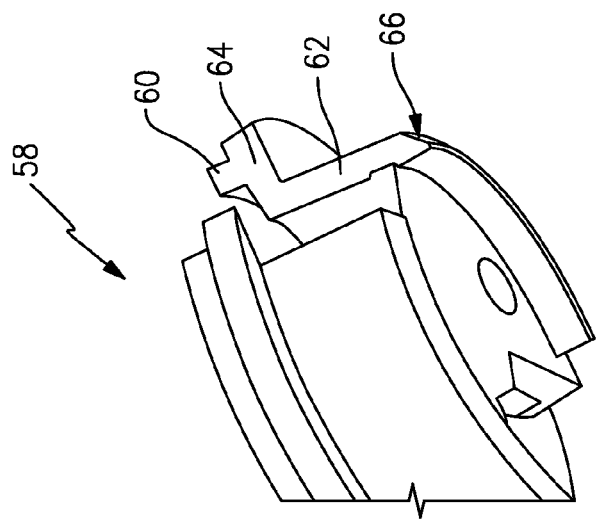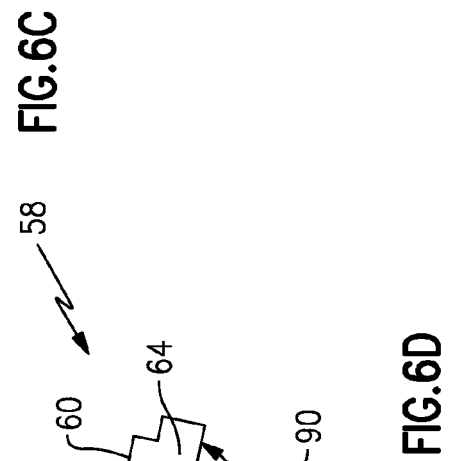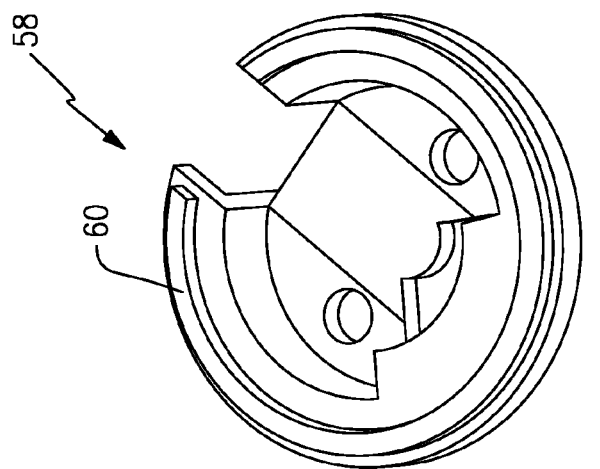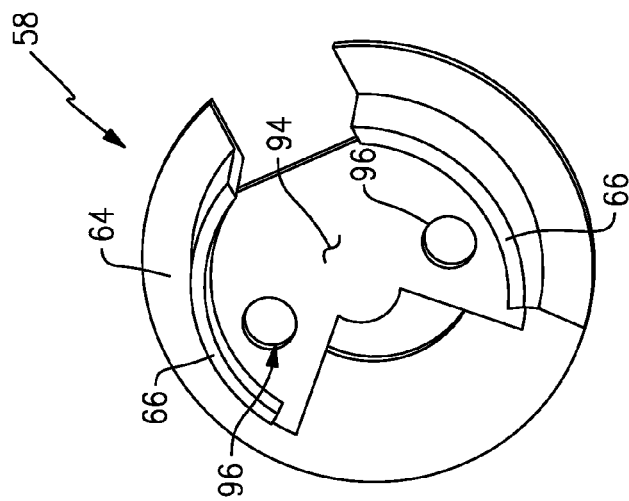
FIG.6C
FIG.6D
FIG.6B
FIG.6A

ILLUMINATION RING IN POINTER HUB

TECHNICAL FIELD

The present disclosure relates to vehicle instrument panels and clusters, and more specifically to hub for a pointer.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. A pointer is typically provided that rotates about a fixed axis to communicate current values of an operational parameter. Pointers are often illuminated to further enhance visibility. Light sources that direct light along the axis or rotation can cause a bright spot at the axis on the pointer. The bright spot is shielded by a pointer cap.

The cap is typically a plastic molded component that blocks light that leaks through the pointer. An instrument panel and gauge is a functional element of a vehicle dashboard, but also contributes to the aesthetic appearance and impression of the vehicle.

Accordingly, designers are continually seeking different configurations to improve the appearance of the instrument panel, while maintaining the required functionality.

SUMMARY

An example gauge assembly according to an exemplary embodiment of this disclosure, among other possible things includes a pointer including a pointer arm extending from a pointer base, a crown attached to the pointer base that includes an illuminatable ring and a cap mounted over the pointer and the crown. The cap includes a first slot revealing the illuminatable ring and a second slot revealing a portion of the pointer arm.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 6A is a perspective view of a bottom side of an example crown.

FIG. 6B is a perspective view of a top of the example crown.

FIG. 6C is a perspective view of a side portion of the example crown.

FIG. 6D is a cross-sectional view of the example crown.

DETAILED DESCRIPTION

Figure 1:
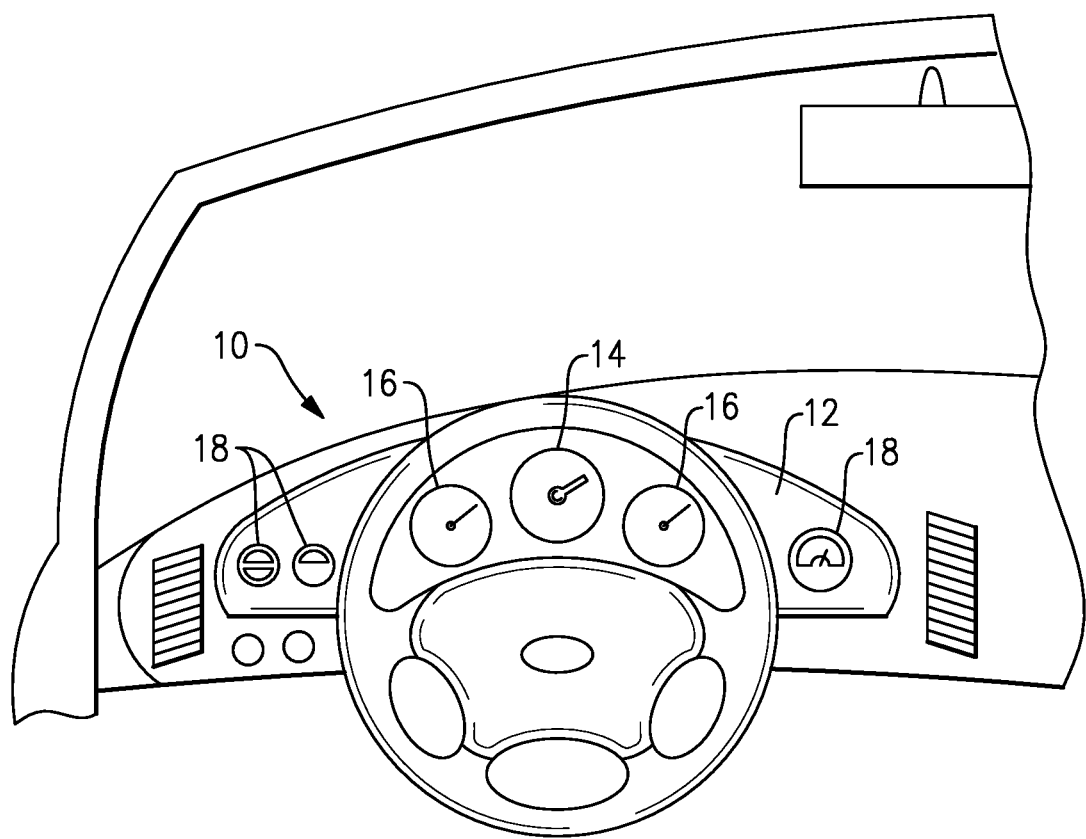
FIG. 1 is a schematic view of an example vehicle dashboard including an instrument panel and gauges.

Referring to FIG. 1, a motor vehicle includes a dashboard 10 supporting an instrument panel 12. The instrument panel 12 includes gauges that include a main gauge 14, secondary gauges 16 and dial gauges 18. As appreciated, the example instrument panel 12 includes the gauges 14, 16 and dial gauges 18 mounted within a common housing for assembly within the dashboard 10. Each of the gauges 14, 16, 18 within the instrument panel 12 communicates information indicative of vehicle operating parameters to an operator of a motor vehicle.

Figure 2A:
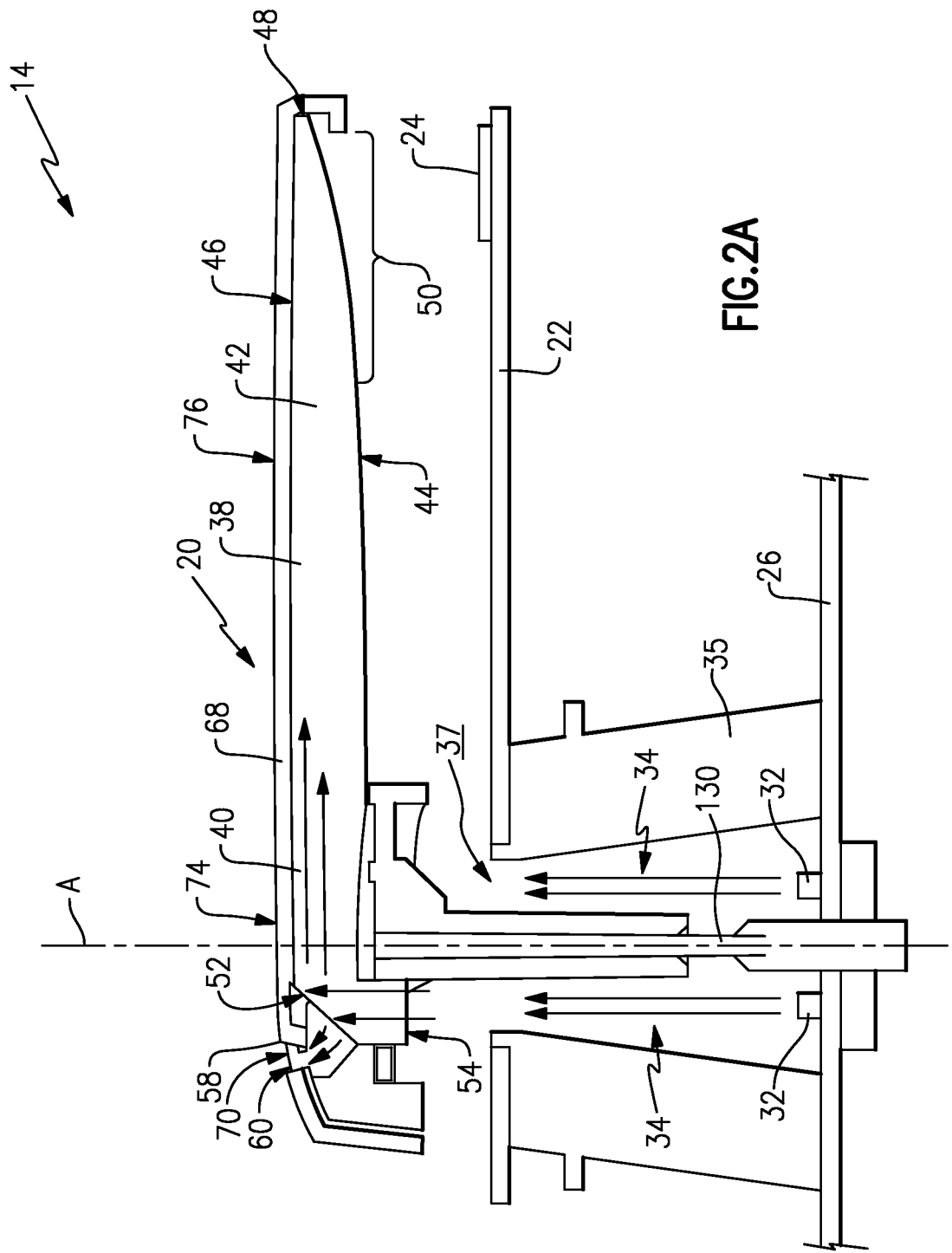
FIG. 2A is a cross-sectional view of an example gauge.
Figure 3:
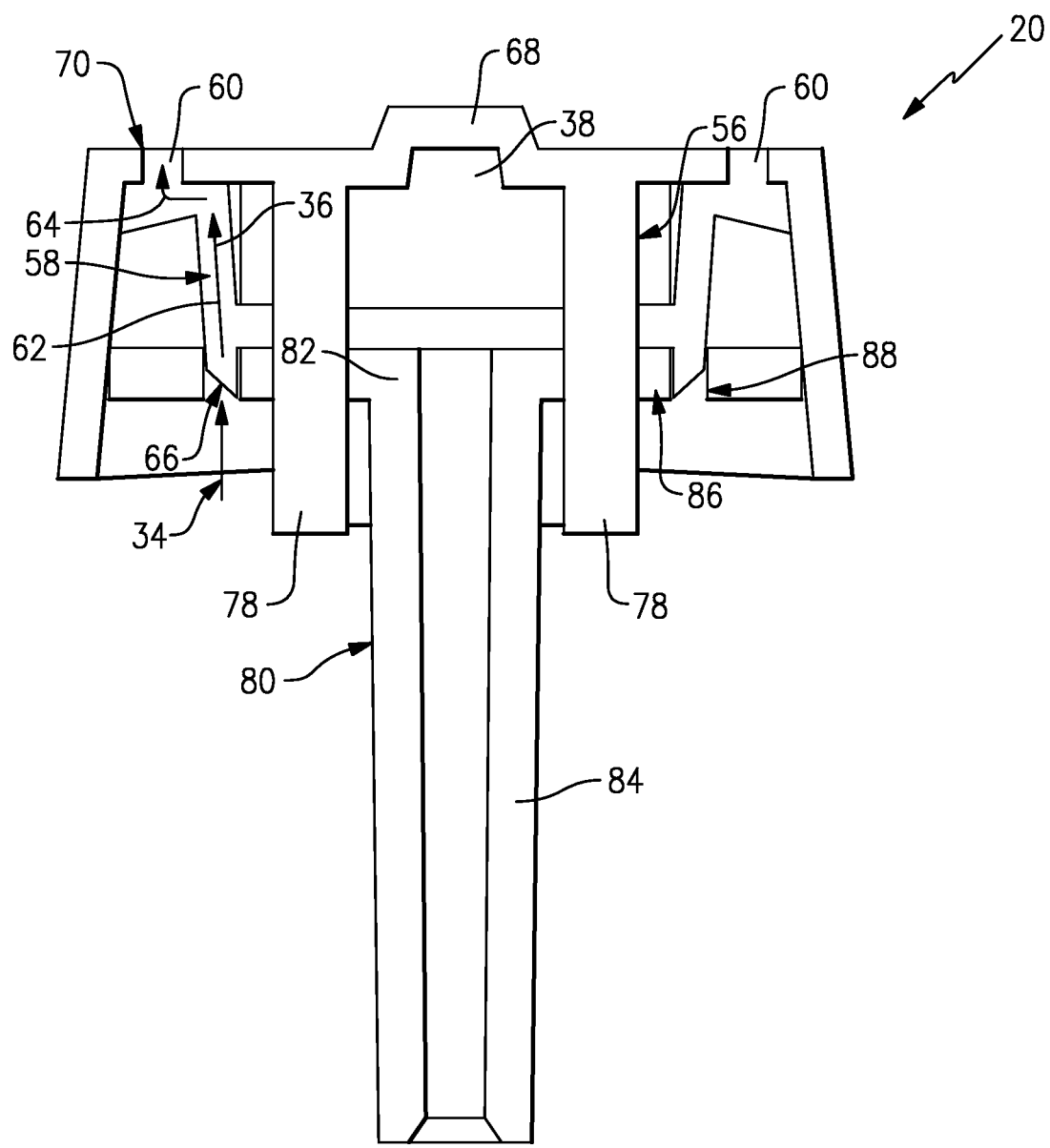
FIG. 3 is a cross-sectional view of an example pointer assembly.

Referring to FIGS. 2A and 3, the example gauge 14 includes a pointer assembly 20 that rotates about an axis A to indicate a specific vehicle operating parameter. The pointer assembly 20 includes a pointer 38, a crown 58 and a cap 68 supported on a shroud 80. The pointer 38 and crown 68 are illuminated by light 34 and are visible through first and second slots 70, 72 defined in cap 68.

The gauge assembly 14 includes a gauge surface 22 with a plurality of graphic characters 24. The pointer assembly 20 is rotated about the axis A by a stepper motor. The pointer assembly 20 indicates to a specific one of the graphic characters 24 on the gauge surface 22 to indicate a current value for a specific vehicle operating parameter. As appreciated, the vehicle operating parameter can be, for example, vehicle speed, engine rpm, temperature, fuel level and any other operating parameter that may be useful or may be communicated to a vehicle operator to provide information indicative of vehicle operation.

The stepper motor is supported on a printed circuit board 26 and drives a shaft 130 that, in turn, moves the pointer assembly 20 about the axis A in relationship to the gauge surface 22. Also mounted on the printed circuit board 26 are lights sources 32. In this example, the light sources 32 comprise light emitting diodes (LED) that are illuminatable to direct light 34 into the pointer assembly 20. The light 34 directed into the pointer assembly 20 is reflected into a pointer 38 and a crown 58 to provide a desired appearance.

Light emitted from the light sources 32 is emitted past the gauge surface 22 into the light receiving surface 54 of the pointer 38. Light is also received within the light receiving surface 66 defined by the crown 56. In this example, the light 34 is emitted about the axis A, but not along the axis A. In other words, the light 34 is not emitted directly through the shaft 130 or stem 84 of the shroud, but is instead propagated within a light housing 35 through an opening 37 in the gauge surface 22 about the axis A such that rotation of the pointer assembly 20 results in light 34 being accepted from some of the light sources 32, but not all of the light sources.

Figure 2B:
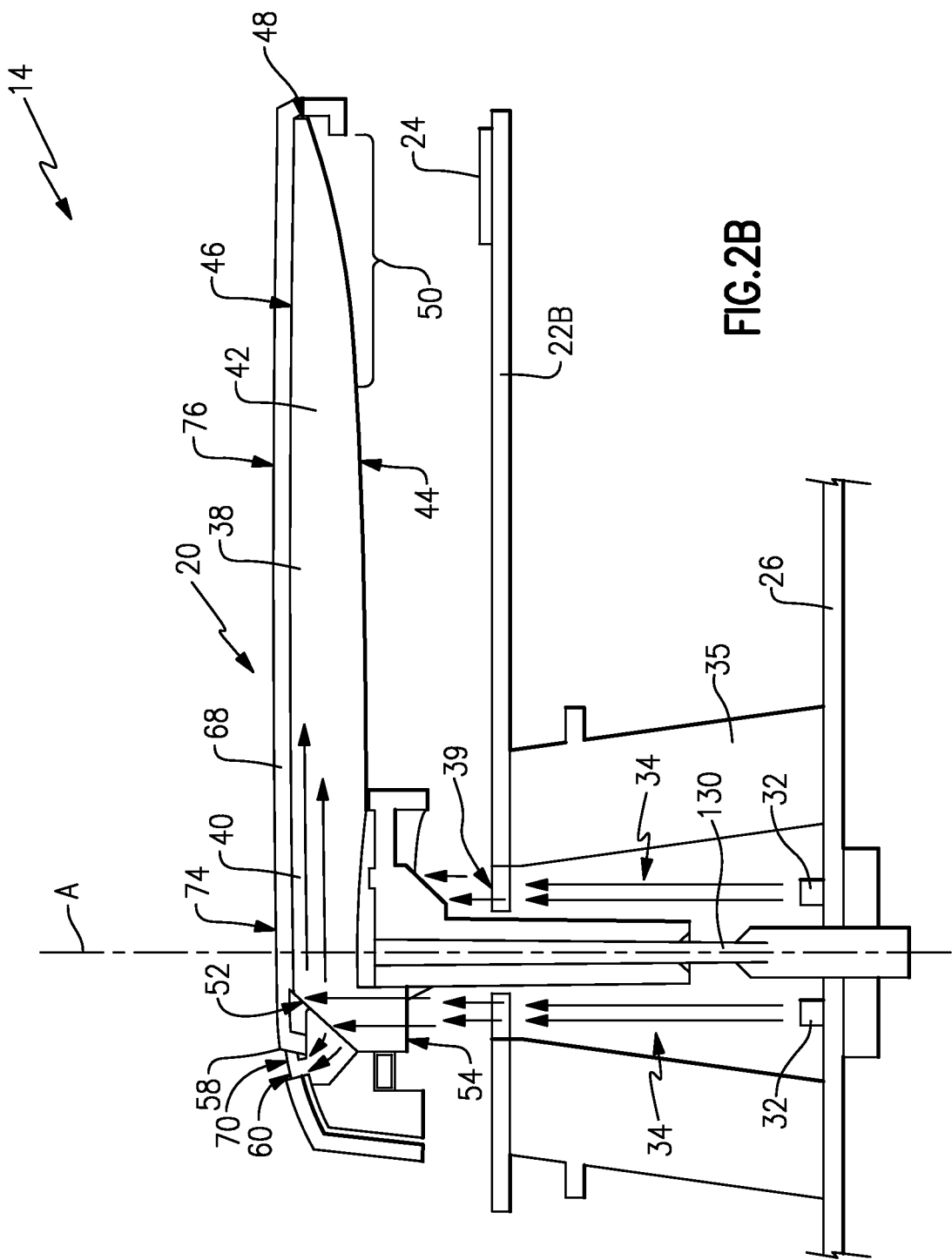
FIG. 2B is a cross-sectional view of another example gauge.

Referring to FIG. 2B, another disclosed embodiment includes a gauge surface 22B that includes a light transparent portion 39 through which light 34 from the light source 32 is propagated to the crown 58 and pointer 38. The light transparent portion 39 maybe clear or colored to impart a desired hue to the light 34 propagated to the crown 58 and pointer 39.

Referring back to FIGS. 2A and 3, light emitted into the pointer 38 is received through light receiving surface 54 and reflected by the light reflecting surface 52 through the pointer arm 42 towards the tip 48. This light is visible through the second slot 72 formed in the cap 68.

Light 34 emitted upward about the axis A is received in the light receiving surface 66 of the crown 58 disposed on either side of the pointer 38 (Best shown in FIG. 3). Light is reflected through the first portion 36 to the second portion 64 and then out the illuminated ring 60 visible through the first slot 70.

Referring to FIG. 6D with continued reference to FIGS. 2A and 3, a slight negative slope between the first portion 36 and the second portion 64 of the crown 58 reduces the intensity of light reflected through the crown 58 such that the illuminated ring 60 provides a desirable light intensity that is not distracting to a vehicle operator. In the disclosed example, an angle 90 between the first portion and the second portion is less than about 90°. The negative slope reduces light communication into the illuminated ring 60 to reduce intensity.

Figure 4:
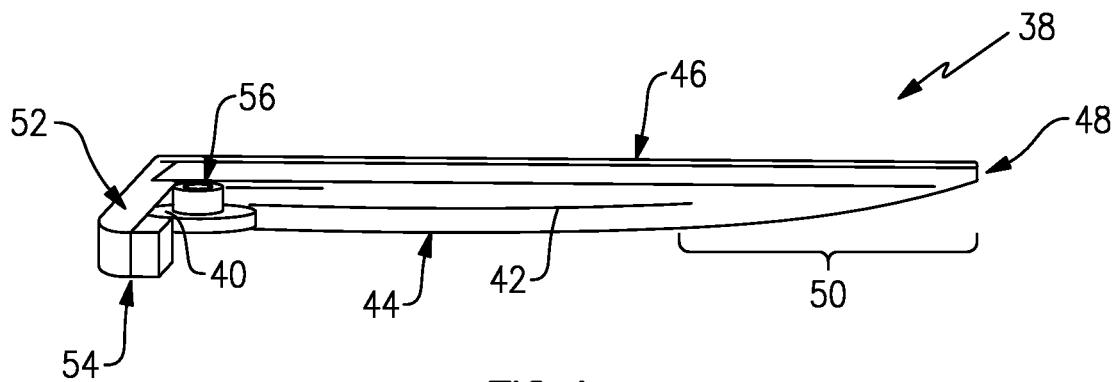
FIG. 4 is a perspective view of an example pointer.
Figure 5A:
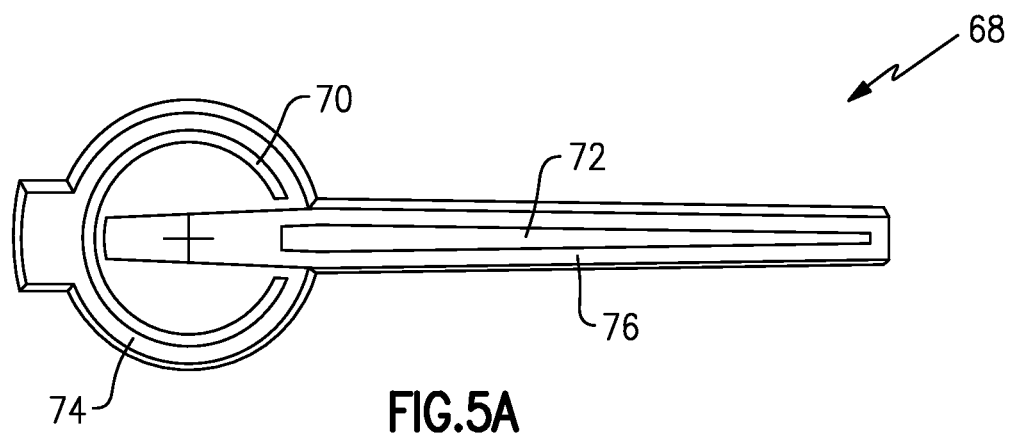
FIG. 5A is a top view of an example cap.
Figure 5B:
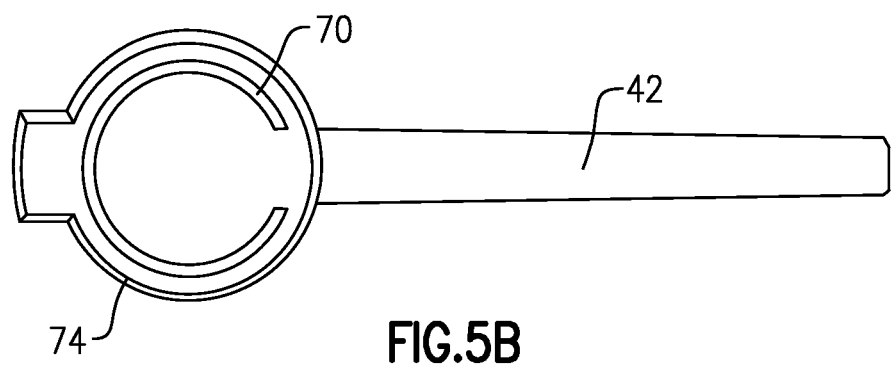
FIG. 5B is a top view of another example cap and pointer arm.

Referring to FIGS. 4 and 5A-5B, with continued reference to FIGS. 2A and 3, the example pointer assembly 20 includes the pointer 38, a crown 58 and a cap 68. The pointer 38 includes an arm 42 extending from a base 40 that is supported on a shroud 80. The shroud 80 includes a base 82 and a stem 84. The stem 84 is attached to the shaft 130 of the stepper motor.

The cap 68 is disposed over the pointer 38 and the crown 58. The example cap 68 includes a center portion 74 and an arm portion 76. In the disclosed example, the center portion 74 and arm portion 76 are separate parts. It is also within the contemplation of this disclosure that the center portion 74 and arm portion 76 are fabricated as a single part making up the cap 68. The center portion 74 includes a first slot 70 through which an illumination ring 60 of the crown 58 extends and is visible (Best shown in FIGS. 5A-5B). Light 34 enters light receiving surface 54 on the pointer base 40 and is directed down the pointer arm 42 towards tip 48.

The pointer arm 42 includes a bottom surface 44 and a top surface 46. The bottom surface 44 includes a taper portion 50 that tapers upward towards the top portion 42 in a direction towards the tip 48. The upward taper portion 50 provides uniform light reflection along the pointer arm 42.

The pointer 38 and the crown 58 are both illuminatable upon receiving light 34 from the light source 32. The crown 58 illuminates the illuminating ring 60 that extends through the first slot 70 defined in the cap 68.

The cap 68 includes pins 78 that extend through openings within the pointer 38 and crown 58. The pins 78 of the cap 68 extend through both the crown 58 and the pointer 38 into openings 86 defined within the shroud 80. The pins 78 are then heat staked or otherwise secured to the shroud 80 to hold the pointer 38 and crown 58 in a desired position on the shroud base 82. The pointer 38 includes openings 56 through which the pin 78 of the cap 68 extend.

The cap 68 includes the first slot 70 through which the illumination ring 60 of the crown 58 is visible. The cap 68 further includes the arm portion 76 with the second slot 72 through which the top surface 46 of the pointer 38 is visible when illuminated. The arm portion 76 of the cap 68 also covers the tip 48 of the pointer 38 to block light from leaking out the tip 48 and being visible to the vehicle operator.

Referring to FIG. 5B, it is also within the contemplation of this disclosure that only the center portion 74 of the cap 68 is utilized and that pointer arm 42 is not covered.

Referring to FIGS. 6A, 6B, 6C and 6D, the example crown 58 includes the first portion 62 that transfers light into the second portion 64. The second portion 64 and the first portion 62 form an inverted L shape with the second portion 64 extending from the first portion 62. The second portion 64 supports the illumination ring 60 that extends through the first slot 70 of the cap 68.

The second portion 64 is disposed at an angle relative to the first portion 62. The angle 90 between the first portion 62 and the second portion 64 is less than 45° to provide a downward slope of the second portion 64. The downward slope of the second portion 64 provides an increase in light scattering and reduces the intensity of light provided and emitted from the illuminated ring 60.

The crown 58 includes a light receiving surface 66 disposed on an end of the first portion 62. The light receiving surface 66 is formed at an angle 92 that is approximately 45°. Although a 45° angle is disclosed, other angles could be utilized for orientating the light receiving surface 66 and are within the contemplation of this disclosure. The light receiving surface 66 is segmented into separate annular sections on the crown 58 and is disposed on either side of the pointer 38 when in an assembled condition. Accordingly, the light receiving surface 66 is not a continual annular surface about the axis A, but is instead two annular surfaces spaced apart from one another and disposed on either side of the pointer 38.

The crown 58 further includes openings 96 through which the pin 78 defined by the crown 68 extend. The pin 78 extends through the openings 96 and the crown 58 and openings 56 within the pointer to secure both the pointer 38 and the crown 68 to the shroud 80.

The example pointer assembly provides additional options for the aesthetic design and appearance of a vehicle gauge assembly. Moreover, the specific configuration of the crown generates a desired light intensity through the hub portion of the pointer assembly to provide an illuminated hub that provides a pleasing aesthetic appearance to a vehicle operator.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A pointer assembly for a gauge comprising:
   a pointer including a pointer arm extending from a pointer base;
   a crown attached to the pointer base including an illuminatable ring; and
   a cap mounted over the pointer and the crown, the cap including a first slot revealing the illuminatable ring.

2. The pointer assembly as recited in claim 1, wherein the crown comprises a translucent material and includes an inner light guide for propagating light to the illuminatable ring.

3. The pointer assembly as recited in claim 2, wherein the light guide comprises an L-shape with a first portion including a light receiving surface and a second portion transverse to the first portion including the illuminatable ring.

4. The pointer assembly as recited in claim 3, wherein an angle between the first portion and the second portion is less than about forty-five (45) degrees.

5. The pointer assembly as recited in claim 3, wherein the light receiving surface is disposed at an angle of about forty-five degrees (45) to the first second portion.

6. The pointer assembly as recited in claim 3, wherein the crown comprises a bottom surface having a matte finish for reducing illumination.

7. The pointer assembly as recited in claim 1, wherein the cap includes an arm portion that covers the pointer arm and includes a second slot revealing a portion of the pointer arm.

8. The pointer assembly as recited in claim 1, wherein the pointer arm includes a bottom surface that tapers upward toward a top surface in a direction toward a distal tip of the pointer arm.

9. The pointer assembly as recited in claim 1, wherein the pointer base includes a reflective surface for propagating light into the pointer arm.

10. The pointer assembly as recited in claim 1, including a shroud including a shroud body supporting the pointer and crown and a shroud stem for attachment to a rotary element to provide rotation about an axis.

11. The pointer assembly as recited in claim 10, wherein the cap includes pins that extend through openings in the crown and pointer for attachment to the shroud.

12. A gauge assembly comprising:
    a gauge surface including graphic indicative of a vehicle operating parameter;
    a pointer including an arm extending from a base;
    a crown attached to the base including an illuminatable ring; and
    a cap mounted over the pointer and the crown, the cap including a first slot revealing the illuminatable ring.

13. The gauge assembly as recited in claim 12, wherein the crown comprises a translucent material and includes an inner light guide for communicating light to the illuminatable ring.

14. The gauge assembly as recited in claim 13, wherein the light guide comprises an L-shape with a first portion including a light receiving surface and a second portion transverse to the first portion including the illuminatable ring.

15. The gauge assembly as recited in claim 14, wherein an angle between the first portion and the second portion is less than about forty-five (45) degrees.

16. The gauge assembly as recited in claim 15, wherein the light receiving surface is disposed at an angle of about forty-five degrees (45) to the first second portion.

17. The gauge assembly as recited in claim 12, wherein the cap includes an arm portion over covering the pointer arm and including a second slot revealing the a part of the arm portion.

18. The gauge assembly as recited in claim 12, wherein the pointer arm includes a bottom surface that tapers upward toward a top surface in a direction toward a distal tip of the pointer arm.

19. The gauge assembly as recited in claim 12, including a shroud including a shroud body supporting the pointer and crown and a shroud stem for attachment to a rotary element to provide rotation about an axis.

20. The gauge assembly as recited in claim 19, wherein the cap includes pins that extend through openings in the crown and pointer for attachment to the shroud.

21. The gauge assembly as recited in claim 19, including a stepper motor driving a shaft attached to the shroud stem.

22. The gauge assembly as recited in claim 12, including a light source directing light into the pointer and the crown.

23. The gauge assembly as recited in claim 22, wherein the gauge surface comprises a substantially transparent portion about an axis rotation of the pointer through which light is propagated into the pointer and crown.

24. The gauge assembly as recited in claim 22, wherein the gauge surface includes an opening about an axis or rotation of the pointer through which light is transmitted into the pointer and crown.

* * * * *